United States Patent [19]
Davis et al.

[11] Patent Number: 5,389,715
[45] Date of Patent: Feb. 14, 1995

[54] POLYMER BLENDS FOR ROOFTOP CURABLE HEAT SEAMABLE ROOF SHEETING AND METHOD FOR COVERING ROOFS

[75] Inventors: James A. Davis, Uniontown; Joseph K. Valaitis, Brecksville, both of Ohio

[73] Assignee: Bridgestone Corporation, Tokyo, Japan

[21] Appl. No.: 163,410

[22] Filed: Dec. 8, 1993

Related U.S. Application Data

[63] Continuation of Ser. No. 918,750, Jul. 27, 1992, abandoned.

[51] Int. Cl.$^6$ ................................................ C08L 9/00
[52] U.S. Cl. ...................................... 524/505; 524/495; 524/525; 524/528; 524/571; 525/95; 525/240
[58] Field of Search ............... 524/495, 505, 525, 571, 524/528; 525/240, 95

[56] References Cited

U.S. PATENT DOCUMENTS

| | | | |
|---|---|---|---|
| 3,280,082 | 10/1966 | Natta et al. | 260/80.7 |
| 3,650,874 | 3/1972 | Job et al. | 161/217 |
| 3,660,530 | 5/1972 | Hoblit et al. | |
| 3,801,531 | 4/1974 | Berejka et al. | 260/33.4 |
| 3,867,247 | 2/1975 | O'Farrell et al. | 161/88 |
| 3,887,530 | 6/1975 | O'Farrell et al. | 260/79.3 |

(List continued on next page.)

FOREIGN PATENT DOCUMENTS

| | | | |
|---|---|---|---|
| 0293059A2 | 5/1988 | European Pat. Off. | C08L 27/06 |
| WO91/09903 | 7/1991 | WIPO | C08L 23/26 |

OTHER PUBLICATIONS

"Rubber–Theromplastic Compositions. Part V. Selecting Polymers For Thermoplastic Vulcanizates", *Rubber Chem. Technol.*, p. 116, vol. 55.

*Primary Examiner*—Edward Cain
*Attorney, Agent, or Firm*—Frank J. Troy, Sr.

[57] ABSTRACT

A rooftop curable heat seamable sheet material for roofing prepared from an uncured polymeric composition of matter which comprises 100 parts by weight of a polymer blend comprising from about 10 to 95 parts by weight of an polymer selected from the group consisting of polyolefins having up to about 2 percent by weight crystallinity, which polyolefins are prepared from monomers having at least 2 carbon atoms, and mixtures thereof; from about 5 to 90 parts by weight of a crystallinity enhancing polymer and mixtures thereof; from about 20 to 300 parts by weight of a filler selected from the group consisting of reinforcing and non-reinforcing materials and mixtures thereof per 100 parts of the polymer blend; from about 1.5 to 10 parts by weight of a cure package a cure package capable of allowing the composition of matter to cure at temperatures of at least 50° C., per 100 parts of the polymer blend; and from about 20 to 150 parts by weight of a processing material and mixtures thereof, per 100 parts of the polymer blend. A method for covering a roof comprises the steps of applying layers of self-adhering sheet material prepared from an uncured heat seamable polymeric composition of matter comprising blends of polyolefins with crystallinity enhancing polymers, fillers, processing materials and a cure package capable of allowing the composition of matter to cure at temperatures of at least 50° C. to the roof being covered; overlapping adjacent edges of the layers; heating the overlapped areas to about the softening point of the sheet material and seaming the overlapped areas under sufficient pressure to provide an acceptable seam strength. The composition of matter is curable at temperatures of at least about 50° C., at temperature readily encountered on the roof of a building. For practice of the method, the composition of matter is self-adhering, without the use of an adhesive.

16 Claims, No Drawings

U.S. PATENT DOCUMENTS

| | | | |
|---|---|---|---|
| 3,919,358 | 11/1975 | Batiuk et al. | 260/897 |
| 3,941,859 | 3/1976 | Batiuk et al. | 260/897 |
| 4,036,912 | 7/1977 | Stricharczuk | 260/897 |
| 4,130,535 | 12/1978 | Coran et al. | 260/33.6 |
| 4,210,579 | 7/1980 | Grigo et al. | 525/88 |
| 4,212,787 | 7/1980 | Matsuda et al. | 260/33.6 |
| 4,220,579 | 9/1980 | Rinehart | 524/525 |
| 4,229,504 | 10/1980 | Barchman | 428/461 |
| 4,247,661 | 1/1981 | Herman et al. | 525/88 |
| 4,263,186 | 4/1981 | Bloemel | |
| 4,355,139 | 10/1982 | Coran et al. | 525/133 |
| 4,435,466 | 3/1984 | Kuhnel et al. | 428/215 |
| 4,438,228 | 3/1984 | Schenck | 524/109 |
| 4,480,012 | 10/1984 | Fieldhouse | 428/506 |
| 4,480,065 | 10/1984 | Kawai et al. | 524/418 |
| 4,537,825 | 8/1985 | Yardley | 428/327 |
| 4,601,935 | 7/1986 | Metcalf et al. | 428/57 |
| 4,687,810 | 8/1987 | Coran | 525/74 |
| 4,732,925 | 3/1988 | Davis | 524/426 |
| 4,742,119 | 5/1988 | Close | 525/211 |
| 4,767,658 | 8/1988 | Lorenz | 428/192 |
| 4,778,852 | 10/1988 | Futamura | 525/97 |
| 4,801,639 | 1/1989 | Hoshi et al. | 524/112 |
| 4,803,020 | 2/1989 | Valaitis et al. | 264/22 |
| 4,833,194 | 5/1989 | Kuan et al. | 524/525 |
| 4,839,412 | 6/1989 | Harrell et al. | 524/436 |
| 4,845,145 | 7/1989 | Hazelton et al. | 524/426 |
| 4,851,463 | 7/1989 | Opsahl et al. | 524/109 |
| 4,855,362 | 8/1989 | Muse, Jr. et al. | 525/194 |
| 4,894,408 | 1/1990 | Hazelton et al. | 524/425 |
| 4,912,148 | 3/1990 | Kim et al. | 524/487 |
| 4,918,127 | 4/1990 | Adur et al. | 524/415 |
| 4,985,502 | 1/1991 | Izumi et al. | 525/194 |
| 5,070,111 | 12/1991 | Dumbauld | 521/82 |
| 5,086,121 | 2/1992 | Hazelton et al. | 525/197 |

POLYMER BLENDS FOR ROOFTOP CURABLE HEAT SEAMABLE ROOF SHEETING AND METHOD FOR COVERING ROOFS

This application is a continuation of U.S. patent application Ser. No. 07/918,750, filed Jul. 27, 1992, abandoned.

TECHNICAL FIELD

The present invention relates generally to sheeting material used for covering roofs. More particularly the sheeting material comprises a blend of an ethylene-propylene-diene terpolymer, referred to herein as EPDM, or ethylene-propylene copolymer, referred to herein as EPR, or other similar olefin type polymers with a crystallinity enhancing polymer. The blend also includes thiuram and thiazole accelerators and is extended with high levels of fillers and processing oils. A method is also provided for covering roofs which includes the step of employing an uncured, self-adhering EPDM, EPR or similar polyolefin sheeting material of the present invention.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured EPDM based roof sheeting has been rapidly gaining acceptance. This material normally is prepared by vulcanizing uncured compositions in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation and sulfur curing, a disadvantage with utilizing these elastomers is the lack of adhesion of EPDM, especially cured EPDM, to itself. This is a serious problem because in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions.

In view of the foregoing problem, it has been necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both short term and long term or stress conditions referred to hereinabove. Moreover, the adhesive must be resistant to oxidation, hydrolysis and chemical attach from ponded water. Additionally, the adhesive must provide the important property often referred to in the adhesive art as "Quick Stick". The term "Quick Stick" means the characteristics of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions presently known generally require anywhere from about two (2) to about seven (7) days at room temperature (i.e. 22° C.) to attain maximum adhesive strength. At higher ambient temperature, this time period may be somewhat less, but at minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two (2) to seven (7) days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties.

One such adhesive system for EPDM elastomers that provides good Quick Stick is described in U.S. Pat. No. 4,480,012, owned by the Assignee of record herein.

Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous.

Of course, the use of EPDM rubber is not limited to roofing materials. In order to increase use of EPDM and enhance its useful properties it is known to form blends with other polymers.

U.S. Pat. No. 4,687,810, for instance, is directed toward a rubber blend comprising EPDM rubber, high-diene hydrocarbon rubber and a vulcanizing agent for the former but not the latter. Such blends can be employed in tire sidewalls.

U.S. Pat. No. 4,833,194, discloses blends of crystalline and amorphous polymers, such as EPR type rubbers, which provide uncured thermoplastic elastomers having good physical properties and weatherability. Typical of such blends are those comprising from about 5 to about 45 percent by weight of an amorphous ethylene-propylene elastomer having less than 65 percent by weight of ethylene; from about 55 to about 95 percent by weight of an crystalline ethylene-propylene elastomer having at least 60 percent by weight of ethylene; and, from about 2 to about 35 parts by weight of a crystalline polymer made from an olefin monomer.

U.S. Pat. No. 4,855,362, provides polymer alloys, or blends, which comprise a highly unsaturated rubbery polymer, a modified EPDM and at least one thermoplastic polyolefin. The blends are formed in order to take advantage of the properties of the unsaturated rubbery polymer and the EPDM, which polymers are difficult to blend. By modifying the EPDM with N-chlorothio-sulfonamides, they become co-curable with the unsaturated rubbery polymer.

This patent also notes in the Background section that blends of thermoplastic materials, such as polypropylene, with EPDM have been found to possess superior strength, high temperature mechanical properties and good compression set. U.S. Pat. No. 4,130,535 discloses thermoplastic elastomers which comprise 25-75 weight percent of thermoplastic polyolefin resin, such as polypropylene, and 75-25 weight percent of monoolefin copolymer rubber, such as EPDM.

SUMMARY OF THE INVENTION

It is thus an object of the present invention to provide polymer blends for heat seamable roof sheeting materials that need not be cured prior to or during application but which will cure subsequently on the rooftop when exposed to sunlight.

It is another object of the present invention to provide polymer blends for heat seamable roof sheeting materials which eliminate the need for a solvent-based splicing adhesive and the related labor and hardware necessary for mixing and application thereof.

It is yet another object of the present invention to provide polymer blends comprising EPDM, EPR, or other similar olefinic type polymers and a crystallinity enhancing polymer which improves the green strength and splice adhesion of heat seamable roof sheeting materials.

It is still another object of the present invention to provide a method for covering roofs which employs polymer blend heat seamable roof sheeting materials which do not require curing and which can be joined and seamed together at their edges without the use of adhesives.

In general the present invention relates to a rooftop curable heat seamable sheet material for roofing prepared from an uncured polymeric composition of matter comprising 100 parts by weight of a polymer blend comprising from about 10 to 95 parts by weight of polyolefins having up to about 2 percent by weight crystallinity, which polyolefins are prepared from monomers having at least 2 carbon atoms, and mixtures thereof and from about 5 to 90 parts by weight of a crystallinity enhancing polymer; from about 20 to 300 parts by weight of a filler selected from the group consisting of reinforcing and non-reinforcing materials and mixtures thereof per 100 parts of the polymer blend; from about 1.5 to 10 parts by weight of a cure package capable of allowing the composition of matter to cure at temperatures of at least 50° C. per 100 parts of the polymer blend; and from about 20 to 150 parts by weight of a processing material and mixtures thereof, per 100 parts of the polymer blend.

A method for covering a roof is also provided and comprises the steps of applying layers of rooftop curable sheet material prepared from an uncured heat seamable, polymeric composition of matter comprising blends of polyolefins with crystallinity enhancing polymers, fillers, processing materials and a cure package, capable of allowing the composition of matter to cure at temperatures of at least 50° C., to the roof being covered; overlapping adjacent edges of the layers; heating the overlapped areas to about the softening point of the sheet material and seaming the overlapped areas under sufficient pressure to provide an acceptable seam strength the composition of matter having sufficient self-adhesion, without the use of an adhesive.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise a blend of EPDM, EPR or similar olefin type polymers with crystallinity enhancing polymers. The term EPDM is used in the sense of its definition as found in ASTM D-1418-85 and is intended to mean a terpolymer of ethylene, propylene and a diene monomer. Illustrative methods for preparing such terpolymers are found in U.S. Pat. No. 3,280,082 the disclosure of which is incorporated herein by reference. The preferred terpolymers contain from about 60 to about 95 weight percent ethylene and from about zero to about 12 weight percent of the diene with the balance of the terpolymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon ® MD-744 (Exxon Chemical Co.) a terpolymer having a Mooney Viscosity (ML/4 at 125° C.) of about 52; an ethylene/propylene (E/P) ratio of 61/39 weight percent and 2.7 weight percent of unsaturation.

The term EPR is used in the sense of its definition as found in ASTM D-1418 and is intended to mean a copolymer of ethylene and propylene. The preferred copolymers contain from about 60 to 95 weight percent ethylene with the balance to total 100 weight percent being propylene. A typical EPR is Vistalon ® 719 (Exxon Chemical Co.) having an ethylene/propylene ratio of about 75/25 weight percent.

To be useful as a roofing material in the present invention the EPDM can have up to about 2 weight percent crystallinity, from the ethylene component; an $\overline{Mn}$ as measured by GPC of at least about 30,000 and an $\overline{Mw}$, as measured by GPC of at least about 100,000. Similarly, the EPR can have up to about 2 weight percent crystallinity (ethylene); an $\overline{Mn}$, as measured by GPC of at least about 30,000 and an $\overline{Mw}$, as measured by GPC of at least about 100,000. We have found that the selection of an amorphous EPDM or EPR having low crystallinity (up to about 2 percent by weight) and weight average molecular weight ($\overline{Mw}=100,000$) is necessary to provide a roofing material which does not require curing prior to application, if ever, and which does not require any type of adhesive, solvent-based or the like, to join and seam the spliced edges.

Also useful as a roofing material in the present invention are copolymers of ethylene and butene. Other similar olefinic type polymers can be used to practice this invention. Generally speaking any amorphous polymer having up to about 2 percent by weight crystallinity and selected from the group consisting of polyolefins prepared from monomers containing at least 2 carbon atoms can be employed. For purposes of discussion herein, references to EPDM, EPR or similar olefinic polymers is intended to include any of the amorphous polymers of the present invention.

The composition or compound employed to form the roof sheeting material comprises a blend of 100 total parts by weight of EPDM, EPR or other similar type olefin type polymers, including mixtures of two or more types, and a crystallinity enhancing polymer to which is added basically fillers, processing oil and accelerators as well as optionally other components including curatives, all of which are discussed hereinbelow.

The crystallinity enhancing polymers of the present invention are selected from the group consisting of polyolefin homopolymers, random copolymers and block copolymers. Homopolymers include polyethylene and polypropylene. Random copolymers include poly(ethylene-co-propylene) copolymers. Block copolymers include poly(ethylene-b-octene) and poly(ethylene-b-butene) copolymers. Mixtures of the foregoing polymers can be employed or a single polymer can be employed to comprise the polymeric blend, with the EPDM or EPR polymer comprising from about 10 to 95 parts by weight for a total of 100 parts of polymer.

Typical examples of commercially available crystallinity enhancing polymer additives that can be blended with EPDM, EPR or other similar polyolefins, materials have been set forth in Table I along with melting temperatures and percent of crystallinity.

TABLE I

| CRYSTALLINITY ENHANCING POLYMERS | | |
|---|---|---|
| ETHYLENE HOMOPOLYMERS | Tm, °C. | % crystallinity |
| POLYWAX 2000[a] | 128 | 89.9 |
| POLYWAX 3000[b] | 121 | 93.2 |
| LDPE 722[c] | 112 | 39.1 |
| LDPE 132[d] | 109 | 27.7 |
| LDPE 640[e] | 113 | 39.9 |
| LDPE 768[f] | 119 | 45.8 |
| LDPE CG-2523[g] | 111 | 53.6 |
| HDPE 12065[h] | 134 | 66.8 |
| HDPE 62013[i] | 131 | 61.2 |
| PETROLITE E-2020[j] | 116 | 85.9 |
| POLYPROPYLENE HOMOPOLYMERS | | |
| EASTOBOND D-7682-109S[k] | 153 | 4.7 |
| A-FAX 500[l] | 155 | 5.8 |
| ETHYLENE/PROPYLENE COPOLYMERS | | |
| RLX-020[m] | 152 | 35.8 |
| ETHYLENE/OCTENE COPOLYMERS | | |
| ATTANE 4003[n] | 123 | 36.9 |
| ATTANE 4001[o] | 124 | 35.0 |
| DOWLEX ® 2047A[p] | 124 | 39.8 |
| DOWLEX ® 2045[q] | 124 | 42.2 |
| DOWLEX ® 2038[r] | 127 | 53.6 |
| DOWLEX ® 2027[s] | 113 | 41.5 |
| ETHYLENE/BUTENE COPOLYMER | | |

TABLE I-continued

CRYSTALLINITY ENHANCING POLYMERS

| ETHYLENE HOMOPOLYMERS | Tm, °C. | % crystallinity |
|---|---|---|
| GERS-1085[t] | 71 | 2.3 |

[a] High melting polyethylene having a molecular weight of about 2000 (Petrolite)
[b] High melting polyethylene having a molecular weight of about 3000 (Petrolite)
[c] Low density polyethylene resin, density 0.916 (Dow Chemical)
[d] Low density polyethylene resin, density 0.919 (Dow Chemical)
[e] Low density polyethylene resin, density 0.922 (Dow Chemical)
[f] Low density polyethylene resin, density 0.930 (Dow Chemical)
[g] Low density polyethylene resin, density 0.923 (Dow Chemical)
[h] High density polyethylene resin, density 0.94 (Dow Chemical)
[i] High density polyethylene resin, density 0.94 (Dow Chemical)
[j] Petroleum-derived oxidized hydrocarbon having an acid number of 22 (Petrolite)
[k] Amorphous polypropylene (Eastman Chemical)
[l] Amorphous polypropylene (Himont, USA, Inc.)
[m] Ethylene/propylene copolymer (2% Ethylene) molecular weight about 400,000 (Phillip's Petroleum)
[n] Ethylene-octane copolymer, density 0.905 (Dow Chemical)
[o] Ethylene-octane copolymer, density 0.912 (Dow Chemical)
[p] Ethylene-octane copolymer, density 0.917 (Dow Chemical)
[q] Ethylene-octane copolymer, density 0.920 (Dow Chemical)
[r] Ethylene-octane copolymer, density 0.935 (Dow Chemical)
[s] Ethylene-octane copolymer, density 0.941 (Dow Chemical)
[t] Ethylene-butene copolymer (about 82% ethylene), density 0.884 (Union Carbide Corporation)

With respect to the filler, suitable fillers are selected from the group consisting of reinforcing and non-reinforcing materials, and mixtures thereof, as are customarily added to rubber. Examples include both inorganic and organic materials such as carbon black, ground coal and cryogenically ground rubber, as well as non-black fillers and the like. Generally, preferred fillers include carbon black, ground coal and cryogenically ground rubber.

Carbon black is used in an amount of about 20 parts to about 300 parts per 100 parts of the polymer blend (phr), preferably in an amount of about 60 to about 150 phr. The preferred range of carbon black herein (60 to 150 phr) is about equal to the amount of carbon black normally used in preparing sulfur cured EPDM sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of 1.129±0.015 and a particle size ranging from about 30 to about 300 microns with an average particle size ranging from about 50 to about 80 microns. Amounts range from about 5 to 40 phr with about 10 to 25 being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Amounts thereof fall within the range of amounts normally employed in preparing sulfur cured conventional roof sheeting.

With respect next to the non-black mineral fillers, suitable fillers are selected from the group comprising of hard clays, soft clays, chemically modified clays, calcined clays, mica, talc, alumina trihydrates, calcium carbonate, titanium dioxide, amorphous precipitated hydrated silica, silicates, silicon dioxide and mixtures thereof. These fillers may partially replace "black" fillers, i.e. carbon black and other related petroleum-derived materials.

Some four basic types of clays are normally used as reinforcing fillers for rubber elastomers. The different types of clay fillers include; airfloated, water washed, calcined and surface treated or chemically modified.

The airfloated clays are the least expensive and most widely used. They are divided into two general groups, hard and soft, and offer a wide range of reinforcement and loading possibilities. Hard Clays are used in the amount of about 20 parts to about 200 parts per 100 parts of polymer (phr), preferably in an amount from about 65 to 175 phr. Any commercially available hard clay may be used. The preferred airfloated hard clays used are: Suprex ®, Barden R ®; LGB ® all commercially available from J. M. Huber Corporation.

The airfloated soft clays are used in the amount of about 20 parts to about 200 parts per 100 parts of polymer(phr), preferably in an amount from about 75 to 175 phr. The preferred airfloated soft clays used are Paragon ®; Hi-White R ®, and K-78 ® commercially available from J. M. Huber Corporation.

Water washed clays are normally considered as semi-reinforcing fillers. This particular class of clays are more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil ® DL, Polyfil ® F, Polyfil ® FB, Polyfil ® HG-90, Polyfil ® K and Polyfil ® XB, all are commercially available from J. M. Huber Corporation.

The third type of clay includes the calcined clays. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil ® 40, Polyfil ® 70, and Polyfil ® 80, all commercially available from J. M. Huber Corporation.

The final type of clay includes the chemically modified reinforcing clays. Cross-linking ability is imparted to the clay by modifying the surface of the individual particles with a polyfunctional silane coupling agent. Chemically modified clays are used in the amount of about 20 parts to about 200 parts per 100 parts of polymer(phr), preferably in an amount from about 60 to 175 phr. Normally the specific gravity of most clays is about 2.60 at 25° C. The preferred chemically modified clays are commercially available from J. M. Huber Corporation and include: Nucap ® 100, Nucap ® 200, Nucap ® 190, Nucap ® 290, Nulok ® 321, Nulok ® 390 and Polyfil ® 368.

Other useful non-black fillers include amorphous silica (silicon dioxide). Silicas are generally classed as wet-process, hydrated silicas because they are produced by a chemical reaction in water, from which they are precipitated as ultrafine, spherical particles. Silica can be employed in the amount of about 20 parts to about 50 parts per 100 parts of polymer(phr), preferably in an amount from about 20 to 50 phr. The useful upper range is limited by the high viscosity imparted by fillers of this type. Some of the commercially available silicas which may be used include: Hi-Sil ® 215, Hi-Sil ® 233, Hi-Sil ® EP and Silene ® D all produced by PPG Industries. Also, a number of useful commercial grades of different silicas are available from J. M. Huber Corporation.

Finely ground calcium carbonate is employed in the amount of about 20 parts to about 200 parts per 100 parts of polymer(phr), preferably in an amount from about 35 to 90 phr. Calcium carbonate generally has a specific gravity of about 2.71 and is commercially available from a number of suppliers including Harwick Chemical, J. M. Huber Corporation, Georgia Marble, Genstar Stone Products and Omya, Inc.

Titanium dioxide is employed in the amount of about 5 parts to about 80 parts per 100 parts of polymer (phr), preferably in an amount from about 10 to 50 phr. Both the rutile and anatase form of titanium dioxide may be used, however, the rutile form is preferred and includes such products as TiPure ® R-960, which is a fine, white powder having a specific gravity of 3.90 and commercially available from DuPont Co.

Other commercially available non-black mineral fillers that may be employed to practice this invention include; talc (magnesium silicate), mica (mixtures of sodium and potassium aluminum silicate) and alumina trihydrate.

With respect to the processing material, it is included to improve the processing behavior of the composition (i.e. reduce mixing time and increase rate of sheet forming) and includes processing oils, waxes and the like). The process oil is included in an amount ranging from about 20 parts to about 150 parts process oil phr, preferably in an amount ranging from about 60 parts to about 135 phr. A preferred processing oil is a paraffinic oil, e.g. Sunpar 2280 which is available from the Sun Oil Company. Other petroleum derived oils including naphthenic oils are also useful.

Regarding the cure package, sulfur and sulfur vulcanizing accelerators and mixtures thereof employed in the rooftop curable membrane composition may range from about 1.5 phr to as high as 10 phr by weight with the preferred amounts ranging from about 1.5 to about 6 phr. Sulfur is employed in amounts of about 0.25 to 2 phr. The roof sheeting compound is not cured prior to application and needed not be cured subsequent thereto. The presence of sulfur enhances bonding of the seams. In addition, the cure package provides one or more vulcanizing accelerators including thioureas such as ethylene thiourea; N,N-dibutylthiourea; N,N-diethylthiourea and the like; thiuram monosulfides and disulfides such as tetramethylthiuram monosulfide (TMTMS); tetrabutylthiuram disulfide (TBTMS); tetramethyl-thiuram disulfide (TMTDS); tetraethylthiuram monosulfide (TETDS); and the like; benzothiazole sulfenamides such as N-oxydiethylene-2-benzothiazole sulfenamide; N-cyclohexyl-2-benzothiazole sulfenamide; N,N-diisopropyl-2-benzothiazolesulfenamide; N-tert-butyl-2-benzothiazole sulfenamide and the like; 2-mercaptoimidazoline; N,N-diphenyl-guanadine; N,N-di-(2-methylphenyl)guanadine; 2-mercaptobenzothiazole; 2-(morpholinodithio)-benzothiazole disulfide; zinc 2-mercaptobenzothiazole and the like; dithiocarbamates such as tellurium diethyldithiocarbamate; copper dimethyldithiocarbamate; bismuth dimethyldithiocarbamate; cadmium diethyldithiocarbamate; lead dimethyldithiocarbamate; zinc diethyldithiocarbamate and zinc dimethyldithiocarbamate.

It should be appreciated that the foregoing list is not exclusive, and that other vulcanizing agents known in the art to be effective in the curing of EPDM terpolymers may also be utilized. For a list of additional vulcanizing agents, see *The Vanderbilt Rubber Handbook*, referenced hereinabove. Amounts of the various components that can be employed in the cure package are set forth in Table II hereinbelow which provides both broad and preferred ranges for each type of component, when present. Again, the total amount of the cure package employed ranges between about 1.5 and 10 phr, depending upon the amount of sulfur, the vulcanizing accelerators selected and the ultimate destination or use of the EPDM composition. That is, when employed as a rooftop curable sheet membrane in a warm climate, different accelerators and/or amounts thereof will be selected than where the sheet membrane is to be installed in a cooler climate. The amounts of sulfur and vulcanizing accelerators employed in the composition are based on parts per hundred rubber by weight.

TABLE II

| Cure Package Components | | |
|---|---|---|
| Ingredients | Broad Range, phr | Preferred Range, phr |
| Sulfur | 0.25–2.0 | 0.5–1.5 |
| Thiuram accelerators | | |
| TMTMS | 0.5–4 | 1–2 |
| TMTDS | 0.5–3.5 | 1–2 |
| TETDS | 0.75–3.5 | 1–2.5 |

TABLE II-continued

| Cure Package Components | | |
|---|---|---|
| Ingredients | Broad Range, phr | Preferred Range, phr |
| Thiazole accelerators | | |
| Captax - MBT | 0.25-3 | 0.35-2 |
| Altax - MBTS | 0.25-3 | 0.35-2.5 |
| Sulfenamide accelerators | | |
| N-cyclohexyl-2-benzothiazole sulfenamide | 0.5-3.5 | 1-2.5 |
| N-tert-butyl-2-benzothiazole sulfenamide | 0.5-3.5 | 1-2.5 |
| Dithiocarbamate accelerators | | |
| Copper dimethyldithiocarbamate | 0.5-3.0 | 1-2.5 |
| Dimethylcyclohexyl-ammonium dibutyl dithiocarbamate | 0.5-2.75 | 1-2.5 |
| Tellurium diethyldithiocarbamate | 0.5-2.5 | 1-2 |

It is to be understood that the cure package comprises sulfur and at least one or more of the foregoing accelerators and thus, the amounts presented in Table II are those wherein one or more of the above accelerators are present. As noted hereinabove, the roof sheeting compound is not cured prior to application and needed not be cured subsequent thereto. The presence of the cure package allows the sheet material to cure at temperatures of at least about 50° C., readily obtainable when exposed to sunlight in most climates.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150 phr, and conventional amounts of other conventional agents, such as zinc oxide, stearic acid, antioxidants, antiozonants, flame retardants, and the like.

The compounding ingredients can be admixed, utilizing an internal mixer (such as a Banbury mixer), an extruder, and/or a two-roll mill, or other mixers suitable for forming a viscous relatively uniform admixtures. When utilizing a type B Banbury internal mixer, in a preferred mode, the dry or powdery materials such as carbon black are added first followed by the liquid process oil and finally EPDM or other polyolefin and crystallinity enhancing polymer (this type of mixing can be referred to as an upside-down mixing technique).

The resulting admixture is sheeted to a thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40-45 gauge thickness since this is the thickness for a large percentage of "single-ply" roofing membranes used commercially. The sheeting can be cut to desired length and width dimensions at this time.

The method of the present invention is practiced by utilizing an EPDM or EPR based elastomeric composite sheet material as described herein. As the sheet is unrolled over the roof substructure in an otherwise conventional fashion, the seams of adjacent sheet layers are overlapped. Overlapping (seam width) can vary according to meet the environment as well as the requirements specified by the architect, building contractor or roofing contractor and thus, does not constitute a limitation of the present invention.

Assuming an overlap of several inches, the next step is to apply heat and pressure to the edge area to form the seam. Temperature is conveniently applied from about 80° to 550° C. Generally, the seam area, comprising overlapping edges of adjacent sheets, should be heated to about the softening point of the sheet material. Numerous techniques which utilize heat and pressure can be used to produce an effective seam as are known to those skilled in the art. Pressure can vary widely from a minimum of about 3 psi up to about 60 psi, typically so long as it is adequate to provide an acceptable seam strength.

In order to demonstrate practice of the present invention, several compounds were prepared and subjected to both peel and shear adhesion tests, as will now be set forth in detail. The EPDM polymer selected included Vistalon ® MD-744. Characterization of the polymer is presented in Table III hereinbelow.

TABLE III

| POLYMER CHARACTERIZATION STUDY | |
|---|---|
| | Vistalon ® MD-744 |
| ML/4 at 125° C. | 53 |
| Ethylene Content, wt % | 60 |
| Crystallinity, wt % | <1 |
| Tg, °C. (by DSC) | −56.4 |
| Tm, °C. (by DSC) | 41.6 |
| Unsaturation, % | 2.7 |
| Type of unsaturation | ENB[a] |
| Mn | 73,200 |
| Mw | 360,400 |
| Mn/Mw ratio | 4.92 |

[a]5-ethylidene-2-norbonene

The following examples are submitted for the purpose of further illustrating the nature of the present invention and are not to be considered as a limitation on the scope thereof. Parts and percentages are by weight, unless otherwise indicated.

TABLE IV

| COMPOSITION OF EPDM AND CRYSTALLINITY ENHANCING POLYMER BLENDS | | | | | | |
|---|---|---|---|---|---|---|
| Example No. | 1 | 2 | 3 | 4 | 5 | 6 |
| Vistalon ® MD-744 | 100 | 90 | 80 | 70 | 60 | 50 |
| Dowlex ® 2045 | 0 | 10 | 20 | 30 | 40 | 50 |
| HiStr GPF black, phr | 110 | 110 | 110 | 110 | 110 | 110 |
| Sunpar 2280 oil, phr | 70 | 70 | 70 | 70 | 70 | 70 |
| Sulfur, phr | 1.10 | 1.10 | 1.10 | 1.10 | 1.10 | 1.10 |
| TMTDS, phr[b] | 0.75 | 0.80 | 0.85 | 0.90 | 0.95 | 1.0 |
| Captax-MBT, phr[c] | 0.30 | 0.30 | 0.65 | 0.35 | 0.35 | 0.40 |
| Sulfads, phr[d] | 0.60 | 0.60 | 0.65 | 0.70 | 0.75 | 0.80 |
| Santocure ®, NS, phr (TBBS)[e] | 0.70 | 0.65 | 0.65 | 0.60 | 0.50 | 0.40 |

TABLE IV-continued
COMPOSITION OF EPDM AND CRYSTALLINITY ENHANCING POLYMER BLENDS

| Example No. | 1 | 2 | 3 | 4 | 5 | 6 |
|---|---|---|---|---|---|---|
| Total | 283.45 | 283.45 | 283.55 | 283.65 | 283.65 | 283.70 |

[a]Dowlex 2045: Ethylene/Octene copolymer
[b]Tetramethylthiuram disulfide (TMTDS)
[c]2-mercaptobenzothiazole (MBT)
[d]dipentamediylene thiuram hexasulfide (DPTH)
[e]N-tert-butyl-2-benzothiazolesulfenamide (WBS)

In the examples illustrated in Table IV, Example No. 1 provided a sulfur cured black EPDM membrane. The remaining examples Nos. 2-6 comprised sulfur cured black EPDM membranes with increasing amounts of a crystallinity enhancing copolymer. Complete formulations for each example appear in Table IV, hereinabove with all parts given on the basis of parts per hundred parts of rubber (phr) by weight, unless otherwise specified.

DETAILED PEEL AND SHEAR ADHESION TEST PROCEDURE

Each of the above rubber compounds was subjected to adhesion testing which necessitated the building of test pads comprising 6×6 inch sheets reinforced by a fiber reinforcement scrim, according to the following procedure:

1. A 10×20-inch two roll mill was utilized to prepare a number of 6×6-inch sheets of rubber approximately 40 mils in thickness for building adhesion test pads.
2. In order to reinforce the uncured sheets of rubber, a 6×6-inch sheet of PVC treated polyester scrim (10×10 epi cord construction) was inserted between two 6×6-inch sheets of rubber.
3. The rubber-scrim assembly was covered with a layer of a Mylar film and placed in the cavity of a metal curing mold (6×6×0.075-inch).
4. The rubber-scrim assembly was then pressed in a Mylar film for about five minutes at about 149° C.
5. Two of the 6×6-inch scrim reinforced rubber pads were seamed together using a hand-held heating gun (Leister). Approximately 15 to 18 pounds force was supplied by means of a roller such as a standard two-inch wide metal roller. Satisfactory seams (either peel or shear) could be formed using only 3 to 4 pounds force and the standard two-inch wide rubber roller. The seams were allowed to equilibrate for 24 hours before testing.
6. A clicker machine with a one-inch wide die was utilized to prepare a number of test specimens for seam peel (Type B, 90° peel) and shear (Type A, 180° peel) adhesion testing.
7. Testing machine: Model 1130 Instron Universal Tester—a testing machine of the constant rate-of-jaw separation type. The machine was equipped with suitable grips capable of clamping the specimens firmly and without slippage throughout the tests.
8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 100° C. Specimens were allowed 15 minutes to preheat prior to testing at elevated temperatures.
9. Adhesion strength is defined as:

peel adhesion strength (lbs/inch)=pounds force×sample width;

shear adhesion strength (lbs/square inch)=pounds force×sample width.

Physical properties of each of the rubber compounds were measured and have been reported in Table V hereinbelow. The unaged, thermoplastic black and oil filled membranes featuring blends of EPDM and crystallinity enhancing polymers exemplified in Table V were characterized as harder, higher modulus polymeric compositions having improved unaged die C tear resistance as compared to the sulfur cured 100% EPDM membrane control, Example No. 1. Physical properties after increasing periods of heat aging are presented in Table VI hereinbelow.

Peel and shear adhesion at increasing temperatures for Example Nos. 1-6 are reported in Tables VII and VIII hereinbelow. Crosshead and chart speeds for all adhesion tests were conducted at the rate of two inches per minute (ipm).

TABLE V
UNAGED PHYSICAL PROPERTIES OF EPDM AND CRYSTALLINITY ENHANCING POLYMER BLENDS IN A HEAT SEAMABLE MEMBRANE

| Example No. | 1 | 2 | 3 | 4 | 5 | 6 |
|---|---|---|---|---|---|---|
| Rheometer at 150° C., 1° Arc | | | | | | |
| Scorch time, minutes | 14.3 | 15.4 | 19.2 | 18.3 | 19.2 | 19.2 |
| Time to 50% cure, min. | 17.0 | 17.5 | 18.3 | 19.4 | 18.6 | 19.1 |
| Time to 90% cure, min. | 21.5 | 22.3 | 23.6 | 24.3 | 19.2 | 24.5 |
| Min. torque, inch-lbs. | 4.8 | 4.6 | 5.3 | 4.2 | 3.5 | 4.7 |
| Max. torque, inch-lbs. | 13.0 | 11.6 | 10.9 | 9.7 | 9.0 | 8.8 |
| Stress-Strain Properties at 23° C. - Unaged Specimens | | | | | | |
| 100% Modulus, psi | 170 | 225 | 325 | 445 | 520 | 890 |
| 300% Modulus, psi | 360 | 535 | 650 | 785 | 900 | 1305 |
| Tensile at break, psi | 605 | 760 | 865 | 940 | 1070 | 1385 |
| Elongation at break, % | 665 | 510 | 495 | 430 | 385 | 340 |
| Stress-Strain Properties at 23° C. - Heat Aged 28 Days at 121° C. | | | | | | |

TABLE V-continued

UNAGED PHYSICAL PROPERTIES OF EPDM AND CRYSTALLINITY ENHANCING POLYMER BLENDS IN A HEAT SEAMABLE MEMBRANE

| Example No. | 1 | 2 | 3 | 4 | 5 | 6 |
|---|---|---|---|---|---|---|
| 100% Modulus, psi | 370 | 505 | 600 | 705 | 785 | 1250 |
| 300% Modulus, psi | 1130 | 1240 | 1285 | 1330 | 1365 | — |
| Tensile at break, psi | 1275 | 1350 | 1335 | 1345 | 1365 | 1490 |
| Elongation at break, % | 405 | 380 | 355 | 310 | 300 | 220 |
| Die C Tear Properties at 23° C. - Unaged Specimens | | | | | | |
| Lbs/inch | 126 | 139 | 190 | 212 | 229 | 279 |
| Shore "A" hardness - Unaged specimens | | | | | | |
| Tested at 23° C. | 49 | 56 | 62 | 69 | 75 | 82 |

TABLE VI

PHYSICAL PROPERTIES OF EPDM AND CRYSTALLINITY ENHANCING POLYMER BLENDS IN A HEAT SEAMABLE MEMBRANE AGED AT 70° C.

| Example No. | 1 | 2 | 3 | 4 | 5 | 6 |
|---|---|---|---|---|---|---|
| Stress-Strain Properties at 23° C. | | | | | | |
| Unaged Controls (zero time) | | | | | | |
| 100% Modulus, psi | 60 | 105 | 205 | 270 | 375 | 635 |
| 300% Modulus, psi | 65 | 145 | 305 | 405 | 510 | 815 |
| Tensile at break, psi | 115 | 165 | 330 | 465 | 535 | 880 |
| Elongation at break, % | 940 | 685 | 350 | 365 | 345 | 335 |
| Heat Aged 7 Days at 70° C. | | | | | | |
| 100% Modulus, psi | 70 | 120 | 220 | 280 | 400 | 665 |
| 300% Modulus, psi | 80 | 160 | 350 | 425 | 535 | 860 |
| Tensile at break, psi | 125 | 195 | 385 | 490 | 570 | 905 |
| Elongation at break, % | 890 | 645 | 340 | 365 | 340 | 330 |
| Heat Aged 14 Days at 70° C. | | | | | | |
| 100% Modulus, psi | 80 | 135 | 235 | 295 | 420 | 675 |
| 300% Modulus, psi | 100 | 180 | 375 | 440 | 555 | 875 |
| Tensile at break, psi | 130 | 210 | 405 | 505 | 600 | 925 |
| Elongation at break, % | 850 | 630 | 335 | 360 | 335 | 325 |
| Heat Aged 21 Days at 70° C. | | | | | | |
| 100% Modulus, psi | 90 | 145 | 245 | 310 | 430 | 690 |
| 300% Modulus, psi | 115 | 195 | 395 | 460 | 585 | 905 |
| Tensile at break, psi | 145 | 235 | 435 | 525 | 630 | 955 |
| Elongation at break, % | 820 | 610 | 325 | 355 | 320 | 320 |
| Heat Aged 28 Days at 70° C. | | | | | | |
| 100% Modulus, psi | 95 | 160 | 255 | 325 | 435 | 695 |
| 300% Modulus, psi | 125 | 210 | 410 | 485 | 610 | 920 |
| Tensile at break, psi | 150 | 160 | 455 | 555 | 670 | 965 |
| Elongation at break, % | 790 | 585 | 330 | 350 | 320 | 315 |
| Heat Aged 35 Days at 70° C. | | | | | | |
| 100% Modulus, psi | 105 | 175 | 260 | 335 | 450 | 710 |
| 300% Modulus, psi | 135 | 230 | 445 | 510 | 645 | 940 |
| Tensile at break, psi | 155 | 285 | 480 | 580 | 710 | 985 |
| Elongation at break, % | 770 | 565 | 325 | 345 | 315 | 315 |
| Heat Aged 42 Days at 70° C. | | | | | | |
| 100% Modulus, psi | 110 | 190 | 270 | 345 | 465 | 730 |
| 300% Modulus, psi | 145 | 265 | 465 | 520 | 675 | 985 |
| Tensile at break, psi | 175 | 320 | 510 | 605 | 710 | 1005 |
| Elongation at break, % | 745 | 545 | 325 | 340 | 315 | 310 |
| Heat Aged 49 Days at 70° C. | | | | | | |
| 100% Modulus, psi | 125 | 200 | 285 | 350 | 475 | 740 |
| 300% Modulus, psi | 165 | 280 | 490 | 555 | 705 | 1015 |
| Tensile at break, psi | 205 | 335 | 535 | 630 | 760 | 1035 |
| Elongation at break, % | 710 | 525 | 320 | 335 | 315 | 310 |
| Heat Aged 56 Days at 70° C. | | | | | | |
| 100% Modulus, psi | 135 | 215 | 300 | 365 | 490 | 760 |
| 300% Modulus, psi | 185 | 305 | 510 | 580 | 735 | 1050 |
| Tensile at break, psi | 235 | 370 | 570 | 655 | 785 | 1065 |
| Elongation at break, % | 675 | 520 | 320 | 325 | 315 | 305 |
| Heat Aged 63 Days at 70° C. | | | | | | |
| 100% Modulus, psi | 140 | 235 | 305 | 385 | 500 | 780 |
| 300% Modulus, psi | 195 | 320 | 530 | 610 | 770 | — |
| Tensile at break, psi | 260 | 410 | 600 | 680 | 815 | 1085 |
| Elongation at break, % | 650 | 510 | 315 | 320 | 305 | 290 |
| Heat Aged 70 Days at 70° C. | | | | | | |
| 100% Modulus, psi | 150 | 240 | 315 | 395 | 510 | 795 |
| 300% Modulus, psi | 200 | 335 | 540 | 625 | — | — |
| Tensile at break, psi | 275 | 440 | 615 | 710 | 845 | 1120 |
| Elongation at break, % | 635 | 505 | 305 | 310 | 295 | 275 |

TABLE VII

PEEL ADHESION STUDY INVOLVING EPDM AND CRYSTALLINITY ENHANCING POLYMER BLENDS

| Example No. | 1 | 2 | 3 | 4 | 5 | 6 |
|---|---|---|---|---|---|---|
| Seam Peel Strength at 23° C. | | | | | | |
| Unaged scrim-reinforced specimens | | | | | | |
| Lbs/inch | 5 | 16 | >25 | >32 | >36 | >47 |
| Type of failure | (A) | (A, B) | (B) | (B) | (B) | (B) |
| Seam Peel Strength at 70° C. | | | | | | |
| Preheat test specimens 15 minutes prior to testing | | | | | | |
| Lbs/inch | 0.2 | 0.5 | >0.9 | >1.1 | >1.5 | >1.8 |
| Type of failure | (A) | (A, B) | (B) | (B) | (B) | (B) |

(A) = Weld failure (separation between rubber plies)
(B) = Slight tearing at or near interface of the two rubber plies, followed by rubber tearing to the fabric reinforcement and eventually rubber separating from the fabric reinforcement.

Based on the test results in Tables VI, VII, and VIII, physical properties as well as peel adhesion and seam shear strength adhesion values for Example Nos. 2-6 were generally significantly better than for the sulfur cured EPDM membrane Example No. 1 (control) thereby demonstrating that the use of EPDM, EPR or other similar olefin type polymers including ethylene-octene or ethylene-butene copolymers or blends thereof and crystallinity enhancing polymers (e.g., homopolymers of ethylene and propylene, random and block copolymers of ethylene and propylene, etc.) in black and oil filled compounds with accelerators, using sufficient pressure and heat (usually in the form of hot air) allow the formation of a self-adhering seam without the use of adhesives.

It is to be understood that the invention is not limited to the specific type of EPDM exemplified herein or by the disclosure or other typical EPDM, EPR or other similar olefin type polymers provided herein, the Examples Nos. 2-6 having been provided merely to demonstrate practice of the subject invention. Those skilled in the art may readily select other EPDM or EPR as well as other similar polyolefins and crystallinity enhancing polymers. Similarly, the invention is not necessarily limited to the particular fillers and processing oil exemplified or the amounts thereof.

In conclusion, it should be clear from the foregoing examples and specification disclosure that the use of EPDM, EPR or other similar polyolefins with crystallinity enhancing polymers to prepare sheet material for roofing allows such sheet material to be seamed using pressure and heat. The seams are self adhering without the use of adhesives. Moreover, the sheet materials do not require curing prior to or during installation. It is to be understood that the invention is not limited to the specific types of EPDM and crystallinity enhancing polymers exemplified herein or by the disclosure of other typical polyolefins and crystallinity enhancing polymers provided herein, the examples having been provided merely to demonstrate practice of the subject invention. Those skilled in the art may readily select other polymers than EPDM, EPR and crystallinity enhancing polymers according to the disclosure made hereinabove. Similarly, the invention is not necessarily limited to the particular fillers, processing oil or accelerators exemplified or the amounts thereof.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A self-adhering rooftop curable heat seamable sheet material for roofing prepared from an uncured polymeric composition of matter comprising:
   100 parts by weight of a polymer blend consisting essentially of
      from at least about 10 to 95 parts by weight of an ethylene-containing polymer selected from the group consisting of polyolefins having up to 2 percent by weight crystallinity, prepared from monomers having at least 2 carbon atoms and mixtures thereof; and
      from about 5 to 90 parts by weight of a crystallinity enhancing crystalline polymer selected from the group consisting of polyethylene homopolymers; poly(ethylene-co-propylene) random copolymers and poly(ethylene-b-octene) and poly(ethylene-b-butene) block copolymers;
   from about 20 to 300 parts by weight of a filler selected from the group consisting of reinforcing and non-reinforcing fillers and mixtures thereof per 100 parts of said polymer blend;
   from about 1.5 to 10 parts by weight of a cure package capable of allowing the composition of matter to cure on a rooftop at temperatures of at least 50° C. per 100 parts of said polymer blend;
   from about 20 to 150 parts by weight of a processing material selected from the group consisting of paraffinic oils, naphthenic oils and waxes and mixtures thereof, per 100 parts of said polymer blend, said sheet material exhibiting a peel adhesion value of at least 2 pounds/inch and a shear adhesion value of at least 15 pounds/square inch, so that seaming is achieved in the absence of an adhesive.

2. A rooftop curable heat seamable sheet material, as set forth in claim 1, wherein said ethylene-containing polymer comprises EPDM having an ethylene content of 60 percent by weight, a weight average molecular weight of about 360,000 and about 1-2 percent by weight crystallinity.

3. A rooftop curable heat seamable sheet material, as set forth in claim 2, wherein said filler comprises about 110 parts by weight of carbon black and said composition of matter includes about 70 parts by weight of said processing material.

4. A rooftop curable heat seamable sheet material, as set forth in claim 3, wherein said cure package is selected from the group consisting of sulfur and sulfur vulcanizing accelerators and mixtures thereof.

5. A rooftop curable heat seamable sheet material, as set forth in claim 4, wherein said vulcanizing accelerator is selected from the group consisting of thioureas;

thiuram monosulfides and disulfides; benzothiazole sulfenamides; dithiocarbamates; 2-mercaptoimidazoline; N,N-diphenyl-guanadine; N,N-di-(2-methylphenyl) guanadine; 2-mercaptobenzothiazole; 2-(morpholinodithio)-benzothiazole disulfide; and zinc 2-mercaptobenzothiazole.

6. A rooftop curable heat seamable sheet material, as set forth in claim 5, wherein said cure package comprises from about 0.25 to 2 parts by weight of sulfur; from about 1 to 4 parts by weight of at least one thiuram accelerator; from about 0.25 to 2 parts by weight of a thiazole accelerator and from about 1 to 1.25 parts by weight of a sulfenamide accelerator per 100 parts by weight of said polymer.

7. A rooftop curable heat seamable sheet material, as set forth in claim 5, wherein said cure package comprises 1.25 parts by weight sulfur; 1.5 parts by weight of a thiuram accelerator; 0.5 to 0.75 parts by weight of a thiazole accelerator and 1 to 1.5 parts by weight of a sulfenamide accelerator per 100 parts by weight of said polymer.

8. A rooftop curable heat seamable sheet material, as set forth in claim 5, wherein said curative is sulfur.

9. A method for covering a roof comprising the steps of:
applying layers of a rooftop curable sheet material prepared from an uncured heat seamable polymeric composition of matter, comprising a polymer blend of ethylene-containing polyolefins and crystallinity enhancing crystalline polymers, with fillers, processing materials and a cure package capable of allowing the composition of matter to cure on the roof at temperatures of at least 50° C., to the roof being covered;
overlapping adjacent edges of said layers;
heating the overlapped areas to about the softening point of the sheet material; and
seaming the overlapped areas under sufficient pressure to provide an acceptable seam strengths, said composition of matter having sufficient self-adhesion without the use of an adhesive.

10. A method, as set forth in claim 9, wherein said step of heating is conducted at a temperature of at least about 82° C.

11. A method, as set forth in claim 9, wherein said polymeric composition of matter is prepared by missing together
100 parts by weight of an uncured polymer blend consisting essentially of
from at least about 10 to 95 parts by weight of an ethylene-containing polymer selected from the group consisting of polyolefins having up to 2 percent by weight crystallinity, prepared from monomers having at least 2 carbon atoms and mixtures thereof; and
from about 5 to 90 parts by weight of a crystallinity enhancing crystalline polymer selected from the group consisting of polyethylene homopolymers; poly(ethylene-co-propylene) random copolymers and poly(ethylene-b-octene) and poly(ethylene-b-butene) block copolymers;
from about 20 to 300 parts by weight of a filler selected from the group consisting of reinforcing and non-reinforcing fillers and mixtures thereof per 100 parts of said polymer blend;
from about 1.5 to 10 parts by weight of a cure package capable of allowing the composition of matter to cure on a rooftop at temperatures of at least 50° C., per 100 parts of said polymer blend;
from about 20 to 150 parts by weight of a processing material selected from the group consisting of paraffinic oils, naphthenic oils and waxes and mixtures thereof, per 100 parts of said polymer blend.

12. A method, as set forth in claim 9, wherein said filler comprises 110 parts by weight of carbon black and said composition of matter includes 70 parts by weight of processing oil.

13. A method, as set forth in claim 12, wherein said cure package is selected from the group consisting of sulfur and sulfur vulcanizing accelerators and mixtures thereof.

14. A method, as set forth in claim 13, wherein said vulcanizing accelerator is selected from the group consisting of thioureas; thiuram monosulfides and disulfides; benzothiazole sulfenamides; dithiocarbamates; 2-mercaptoimidazoline; N,N-diphenyl-guanadine; N,N-di-(2-methylphenyl) guanadine; 2-mercaptobenzothiazole; 2-(morpholinodithio)-benzothiazole disulfide; and zinc 2-mercaptobenzothiazole.

15. A method, as set forth in claim 14, wherein said cure package comprises from about 0.25 to 2 parts by weight of sulfur; from about 1 to 4 parts by weight of at least one thiuram accelerator; from about 0.25 to 2 parts by weight of a thiazole accelerator and from about 1 to 1.25 parts by weight of a sulfenamide accelerator per 100 parts by weight of said polymer.

16. A method, as set forth in claim 14, wherein said cure package comprises 1.25 parts by weight sulfur; 1.5 parts by weight of a thiuram accelerator; 0.5 to 0.75 parts by weight of a thiazole accelerator and 1 to 1.5 parts by weight of a sulfenamide accelerator per 100 parts by weight of said polymer.

* * * * *